3,294,542
PHOTOSENSITIVE DIAZO COMPOSITIONS
Oskar Süs, Wiesbaden-Biebrich, and Heinz Schäfer, Wiesbaden-Sonnenberg, Germany, assignors to Keuffel & Esser, Hoboken, N.J.
No Drawing. Filed Dec. 21, 1964, Ser. No. 420,122
Claims priority, application Germany, Dec. 23, 1963, K 51,717
8 Claims. (Cl. 96—91)

The present invention relates to diazo couplers, compositions and materials and refers more particularly to diazo couplers, compositions and materials for making red dye images.

Two-component diazotype materials for making photocopies with red and brown-red tones can be prepared by the dry process by using a diazotized para-phenylene diamine having a tertiary nitrogen atom and an amide of 3,5-dihydroxy-benzoic acid (resorcylic acid). In order to improve the water-fastness of the copies prepared by this combination, 3,5-dihydroxy-benzoic acid arylamides, such as 3,5-dihydroxy-benzoic acid anilide, have been proposed. The use of these compounds is, however, rendered difficult by their poor solubility in water, thus presenting difficulties in coating from aqueous solutions.

It has now been found that this disadvantage can be overcome.

Therefore, one object of the present invention is to provide a diazo coupler, composition and material which overcome the disadvantages of the prior art.

Another object is to provide diazo materials coated with the present novel combination.

Other objects will become apparent in the course of the following specification.

Excellent photocopies with red tones can be prepared with a substituted 2-(3',5'-dihydroxyphenyl)-benzimidazole having the following general formula:

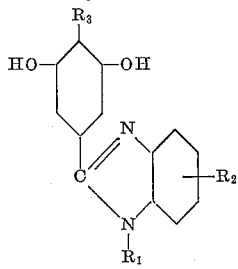

where $R_1$ is a member selected from the group consisting of hydrogen and lower alkyl; $R_2$ is a member selected from the group consisting of hydrogen, lower alkyl, lower alkoxy and a halogen atom with an atomic weight of at most 80; and $R_3$ is a member selected from the group consisting of hydrogen and bromine.

A mixture of several of these compounds may be used.

$R_1$ is preferably an alkyl group with one to three carbon atoms. Where $R_1$ is substituted, the substituents are preferably one or several hydroxyl groups, amino groups, or substituted amino groups. Suitable substituted amino groups are lower alkylated amino groups and dialkylated amino groups in which the two alkyl groups are attached to each other by a carbon, oxygen, or nitrogen atom to complete a five- or six-membered ring. Examples are the pyrrolidino, piperidino, and morpholino groups. $R_2$ is preferably methyl, methoxy, ethoxy, or chlorine.

The formulas of some of the 2-(3',5'-dihydroxyphenyl)-benzimidazoles used according to the present invention are shown in the table. The compounds are new and are distinguished by their great stability "as is," in solution, and in the light-sensitive coating. In the form of their salts these substituted benzimidazoles are water-soluble. The salt-forming group is the heterocyclic ring. The basicity of this ring may be strengthened by the above mentioned substituents for the radical $R_1$, since another salt-forming group may be thus introduced. For salt formation, inorganic acids, such as hydrochloric acid and sulfuric acid, and organic acids, such as acetic acid, citric acid, or tartaric acid, or mixtures of these acids, are suitable. It is not necessary to isolate the salts since they also form when the free base is added to a sensitizing solution containing excess acid as stabilizers.

In order to prepare the novel 2-(3',5'-dihydroxyphenyl)benzimidazoles used according to the present invention, the acylated 3,5-dihydroxy-benzoic acid chlorides may be used as a starting material. These can be converted into the desired substituted benzimidazoles by one of the following two ways.

(A) The acylated 3,5-dihydroxy-benzoic acid chloride (which may be halogen-substituted) is reacted with an ortho-phenylene diamine in which the substituents $R_1$ and $R_2$ are already present. The acylated hydroxy groups are saponified (for example with dilute caustic soda solution) and the resulting 3,5-dihydroxy-benzoic acid-ortho-aminophenylamide is boiled with moderately strong to strong acid (for example about 30% hydrochloric acid) to form the benzimidazole ring by splitting off water. If desired, the deacylation and the ring-closing reaction may be carried out with strong hydrochloric acid in one step.

(B) The acylated 3,5-dihydroxy-benzoic acid chloride (which may be halogen-substituted) is reacted with an ortho-nitroaniline in which the substituents $R_1$ and $R_2$ are already present, and the resulting ortho-acylated 3,5-dihydroxy-benzoic acid ortho-nitrophenyl-amide is reduced to the ortho-aminophenylamide. The two hydroxyl groups are liberated by saponification with dilute caustic soda solution, and the imidazole ring is then closed by boiling with glacial acetic acid in the presence of small amounts of concentrated sulfuric acid.

A more detailed description of these two methods of preparation is given in Example 1 for Method A and in Example 3 for Method B.

Suitable diazotized para-phenylenediamines which are used together with the 2-(3',5'-dihydroxyphenyl)benzimidazole according to the present invention are those which contain two lower alkyl or hydroxyalkyl groups on the nitrogen atom in para position to the diazo group. In this case, too, the two alkyl groups may be attached to each other by a carbon, oxygen, or nitrogen atom to complete a 5- or 6-membered ring. Diazotized para-phenylene diamines with tertiary nitrogen atoms containing two lower alkoxy groups, in para-position to one another, are particularly suitable.

Some examples are the salts of 1-diazo-4-diethylamino-benzene; 1-diazo- 4 - dipropylamino - benzene; 1-diazo-2-ethoxy-4-diethylamino-benzene; 1-diazo-4-(hydroxyethyl-ethylamino)-benzene; 1-diazo-2,5-dimethoxy-4 - morpholino-benzene; and 1 - diazo - 2,5 - diethoxy-4-morpholino-benzene.

The 2-(3',5'-dihydroxyphenyl)-benzimidazoles according to the present invention are suitable for the sensitizing of normal photocopying papers or transparent papers and films. For papers, the substituted benzimidazole is applied to the support from aqueous solutions. For transparent papers and films, solvents such as isopropyl alcohol may be added. In either solution, additives conventional in diazotype coatings for increasing the stability of the coatings and for providing an anti-yellowing effect may be used. The greater technical importance is attached to diazotype material prepared with transparent supports. Photocopies prepared therefrom exhibit the red tone desired in practice. Such copies may be used in color projections for instructional purposes. They are also suitable for the preparation of highly visible intermediate originals for further photocopying. In the latter case, it may be necessary to add a second azo component which yields a yellow dye with good covering power against the type of light used for the exposure.

The present invention is further illustrated by the following examples and the table. In the table, the formula of the substituted benzimidazole, the preparation method (A or B), and the decomposition point in degrees centigrade are listed. The formula numbers in the examples correspond to those in the table.

*Example 1*

A photocopying paper provided with a precoat of colloidal silica and polyvinyl acetate was coated with the following solution:

| | |
|---|---|
| Citric acid _____ g__ | 4 |
| Boric acid _____ g__ | 2 |
| Concentrated hydrochloric acid _____ ml__ | 0.5 |
| Thiourea _____ g__ | 4 |
| Naphthalene-1,3,6-trisulfonic acid (sodium salt) _g__ | 3 |
| 4-diethylamino benzene diazonium chloride (zinc chloride double salt) _____ g__ | 1 |
| 1-γ-morpholinopropyl-2-(4' - bromo-3',5'-dihydroxyphenyl)-benzimidazole (Formula 14) _____ g__ | 2 |
| Water _____ ml__ | 100 |

Drying was carried out in conventional manner and exposure effected under a transparent original. After developing with ammonia gas, high contrast copies with bluish-red lines on a pure white background were obtained. The copies were distinguished by high light-fastness and their keeping qualities in files.

Instead of the substituted benzimidazole of Formula 14, 1-ethyl-2-(3',5'-dihydroxyphenyl)-6-methyl-benzimidazole (Formula 12) may also be used with somewhat less favorable results.

The compound of Formula 14 was prepared as follows: 33.5 g. of 4-bromo-3,5-diacetoxy-benzoyl chloride were dissolved in 100 ml. dioxane and then slowly added dropwise with stirring at 30–40° C. to a solution of 21.5 g. of N-(γ-morpholinopropyl)-ortho-phenylene-diamine in 49 ml. dioxane and 8 ml. pyridine. After the reaction, the dioxane was evaporated to leave a syrupy residue. In order to split off the acetyl groups and effect purification, the reaction produce was dissolved in dilute, warm 2 N caustic soda solution and the saponification product precipitated by addition of acetic acid. The resulting free base sintered before melting at about 115° C. with decomposition. For the ring-closing reaction, 20 g. of this base were heated with 100 ml. 30% hydrochloric acid at 90° C. for 30 minutes and then boiled further for 10 minutes. During cooling, the hydrochloride of the 1-γ-morpholinopropyl-2-(4' - bromo-3',5'-dihydroxyphenyl)-benzimidazole crystallized. In order to effect purification, the crude produce was recrystallized several times from water. Colorless crystals were obtained which sintered before melting at 255° C. with decomposition. The free base was obtained by dissolving the hydrochloride in caustic soda solution and neutralizing the solution with acetic acid. After recrystallization from chlorobenzene, it melted at 208–209° C. with decomposition.

The compound of Formula 12 was prepared analogously.

*Example 2*

The following ingredients were dissolved in 100 ml. of a 50:50 mixture of water and isopropanol:

| | |
|---|---|
| Citric acid _____ g__ | 3 |
| Boric acid _____ g__ | 2 |
| Thiourea _____ g__ | 2 |
| Ethyleneglycol _____ ml__ | 5 |
| 4-morpholino-2,5-diethoxy-benzene diazonium chloride (zinc chloride double salt) _____ g__ | 3.5 |
| 1 - β - hydroxyethyl - 2 - (4'-bromo-3',5'-dihydroxyphenyl) - benzimidazole hydrochloride (Formula 13) _____ g__ | 4 |

A baryta paper lacquered with cellulose acetate was coated with the solution. The photocopies prepared according to Example 1 with this material had strong red lines on a pure white background.

Equally good results were achieved with the compound of Formula 10, 1-methyl-2-(4'-bromo-3',5'-dihydroxyphenyl)-benzimidazole, and not quite so good results with the compound of Formula 11, 1-methyl-2-(4'-bromo-3',5'-dihydroxyphenyl)-5-methoxy-benzimidazole.

The compounds of Formulas 13, 10 and 11 were obtained in a manner analogous to the method of preparation described in Example 1 for the compound of Formula 14.

*Example 3*

A mixture of 50 ml. of water and 50 ml. of isopropanol was used to dissolve the following:

| | G. |
|---|---|
| Citric acid _____ | 2 |
| Boric acid _____ | 1 |
| Thiourea _____ | 2 |
| 2 - (4'-bromo-3',5'-dihydroxyphenyl)-5-methyl-benzimidazole (Formula 7) _____ | 2 |
| 4-morpholino-2,5-dimethoxy-benzene diazonium chloride (zinc chloride double salt) _____ | 3 |

A transparent paper lacquered with cellulose acetate was coated with this solution. The photocopies prepared in conventional manner had slightly bluish-red lines. When a yellow component such as catechol monohydroxyethylether was added, very contrasty intermediates were obtained.

The compound of Formula 2, 2-(3',5'-dihydroxyphenyl)-benzimidazole, the compound of Formula 4, 2-(3',5'-dihydroxyphenyl) - 6 - methoxy-benzimidazole, the compound of Formula 5, 2-(4'-bromo-3',5'-dihydroxyphenyl)-5-ethoxy-benzimidazole, the compound of Formula 6, 2-(3',5'-dihydroxyphenyl)-5-ethoxy-benzimidazole, the compound of Formula 8, 2-(3',5'-dihydroxyphenyl)-5-methyl-benzimidazole or the compound of Formula 9, 2-(4'-bromo-3',5'-dihydroxyphenyl) - 5 - chloro-benzimidazole may also be used, although with somewhat less advantageous results.

The compound of Formula 7 was prepared as follows: 152 g. of 3-nitro-4-amino-toluene were dissolved in 600 ml. dioxane and 78 ml. pyridine. This solution was added dropwise at 60–70° C. with stirring to 335 g. 4-bromo-3,5-diacetoxy-benzoyl chloride dissolved in 1000 ml. dioxane. After 45 minutes the acetyl compound was saponified by addition of 100 ml. of 5 N caustic soda solution and the solution rendered neutral with hydrochloric acid. The carboxylic acid amide obtained was reprecipitated from caustic soda solution/hydrochloric acid in order to purify it. The yield was 280 g. with a melting point of 205° C.

The reduction of the nitro group was accomplished catalytically in the presence of Raney nickel. From 260 g. of nitro compound, 220 g. of amine were obtained. The amine melted at 173° C. with decomposition.

For the ring-closing reaction, 110 g. of amine were heated to the boiling point with 500 ml. of glacial acetic acid for two hours with stirring. 5 ml. of pure sulfuric acid were then added and heating was continued for a further thirty minutes. After cooling, the coarse brown crystals were filtered off with suction, dissolved in dilute caustic soda solution, again filtered off with suction, and the filtrate rendered neutral with acetic acid. The purification of the crude benzimidazole was achieved by again recrystallizing from dimethylformamide/water. The yield was 40 g. with a melting point of 282° C. with decomposition. The preparation of compounds of Formulas 2, 4, 5, 6, 8, and 9 was effected in an analogous manner.

Example 4

A film of cellulose acetate was coated with a solution of:

|   | G. |
|---|---|
| Citric acid | 4 |
| Aluminum sulfate | 2 |
| Boric acid | 2 |
| Thiourea | 2 |
| 2-(4'-bromo-3',5'-dihydroxyphenyl)-6-methoxybenzimidazole (Formula 3) | 4 |
| 4-dipropylamino-benzene diazonium chloride (zinc chloride double salt) | 3 |

These ingredients were coated from a mixture of 50 ml. of water and 50 ml. of isopropanol. After exposure, copies with strongly dark red lines were obtained.

Instead of the compound of Formula 3, the compound of Formula 1, 2-(4'-bromo-3',5'-dihydroxyphenyl)-benzimidazole may also be used, and will give somewhat less favorable results.

The preparation of the compounds of Formulas 1 and 3 is analogous to that for Compound 7 (see Example 3).

It is apparent that the described examples are capable of many variations and modifications. All such variations and modifications are to be included within the scope of the present invention.

| | | | |
|---|---|---|---|
| 1 | 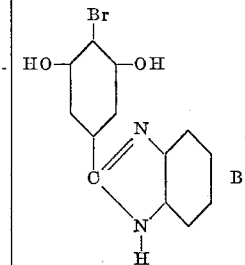 | 283° C. | |
| 2 | 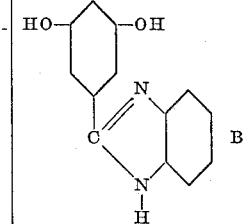 | 310° C. | |
| 3 | 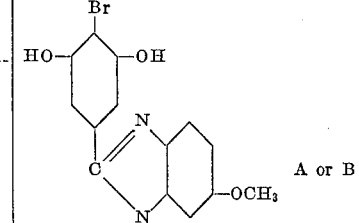 | 272° C. | A or B |
| 4 | 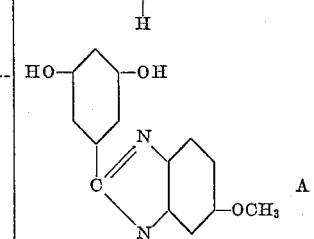 | 290° C. | A |
| 5 | 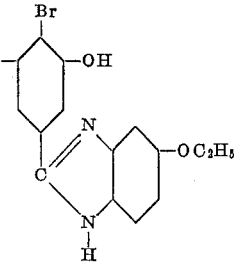 | 267° C. | B |
| 6 | 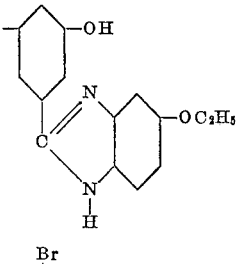 | 284° C. | B |
| 7 | 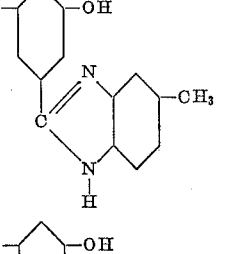 | 282° C. | B |
| 8 | 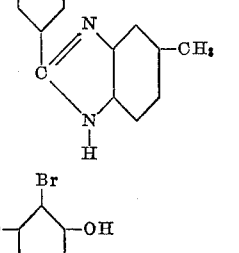 | 337° C. | B |
| 9 | 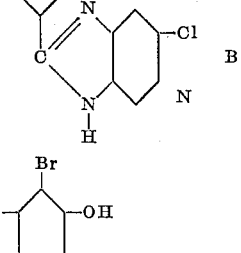 | 260° C. | B |
| 10 | 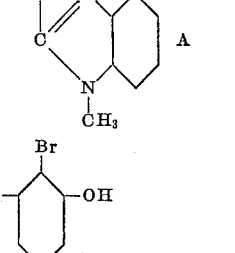 | 272° C. | A |
| 11 | 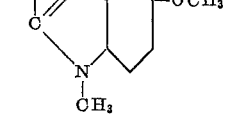 | 252° C. | A |

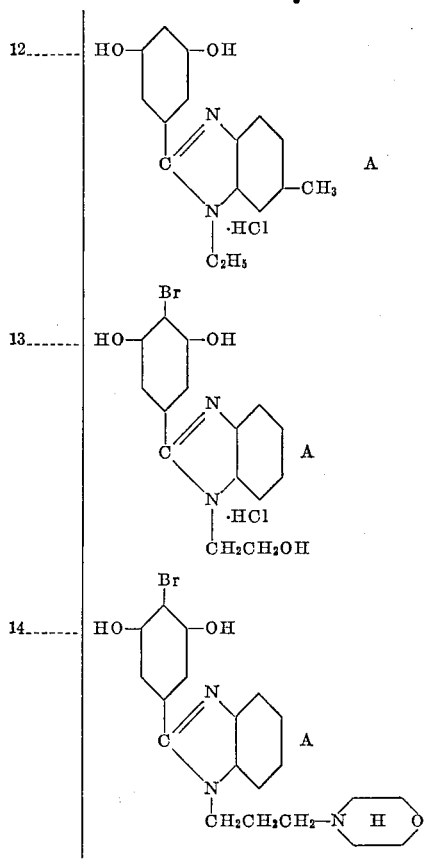

| | | |
|---|---|---|
| 12 | HO—⬡—OH / structure with CH₃, ·HCl, C₂H₅ | 303/305° C. |
| 13 | HO—⬡(Br)—OH / structure with ·HCl, CH₂CH₂OH | 248/249° C. |
| 14 | HO—⬡(Br)—OH / structure with CH₂CH₂CH₂—N⟨morpholino⟩ | 208/209° C. |

What is claimed is:

1. A diazo composition comprising a unilaterally diazotized paraphenylene diamine salt and a 2-(3',5'-dihydroxyphenyl)-benzimidazole salt.

2. A diazo composition comprising a unilaterally diazotized paraphenylene diamine salt and a salt of a 2-(3',5'-dihydroxyphenyl) - benzimidazole having the general formula:

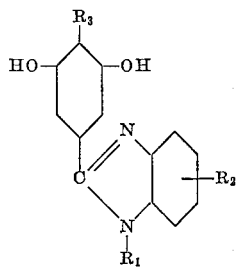

where $R_2$ is a member selected from the group consisting of hydrogen, alkyl with one to three carbon atoms, hydroxyalkyl with one to three carbon atoms, and morpholino alkyl; $R_2$ is a member selected from the group consisting of hydrogen, alkyl with one to three carbon atoms, alkoxy with one to three carbon atoms, and halogen with atomic weight of at most 80; and $R_3$ is a member selected from the group consisting of hydrogen and bromine.

3. A diazo composition comprising 4-dipropylaminobenzene diazonium chloride (zinc chloride double salt) and 2 - (4' - bromo - 3',5' - dihydroxy - phenyl) - 6-methoxy-benzimidazole salt.

4. A diazo composition comprising 4-morpholino-2,5-dimethoxybenzene diazonium chloride (zinc chloride double salt) and 2 - (4' - bromo - 3',5' - dihydroxyphenyl)-5-methyl-benzimidazole salt.

5. A diazo composition comprising 4-morpholino-2,5-diethoxy - benzene diazonium chloride (zinc chloride double salt) and 1-methyl-2-(4'-bromo-3',5'-dihydroxyphenyl)-benzimidazole salt.

6. A diazo composition comprising 4-morpholino-2,5-diethoxybenzene diazonium chloride (zinc chloride double salt) and 1-β-hydroxyethyl-2-(4'-bromo-3',5'-dihydroxyphenyl)-benzimidazole salt.

7. A diazo composition comprising 4 - diethylaminobenzene diazonium chloride (zinc chloride double salt) and 1 - γ - morpholinopropyl - 2(4' - bromo - 3',5' - dihydroxyphenyl)-benzimidazole salt.

8. A diazo composition for making two-component diazotype material yielding a highly visible red-tinted dye image suitable for reproduction and as an intermediate original, which comprises the unilaterally diazotized para-phenylene diamine salt and a coupler mixture of a 2-(3',5'-dihydroxyphenyl)-benzimidazole salt and a coupling component for making a yellow dye.

References Cited by the Examiner
UNITED STATES PATENTS

| | | | |
|---|---|---|---|
| 2,530,349 | 11/1950 | Craig | 260—309.2 |
| 2,548,845 | 4/1951 | Neumann | 96—91 |
| 2,663,712 | 12/1953 | Tulagin | 260—309.2 |
| 3,061,435 | 10/1962 | Tomanek et al. | 96—75 |
| 3,099,559 | 7/1963 | Coles | 96—48 |
| 3,152,142 | 10/1964 | Moyle et al. | 260—309.2 |
| 3,182,070 | 5/1965 | Moyle | 260—309.2 |

NORMAN G. TORCHIN, *Primary Examiner.*

ALEXANDER D. RICCI, *Assistant Examiner.*